US012555855B2

(12) United States Patent
Yildiz et al.

(10) Patent No.: US 12,555,855 B2
(45) Date of Patent: Feb. 17, 2026

(54) COMPOSITE BATTERY PACK WALL WITH MICA INNER LAYER

(71) Applicant: PROTERRA POWERED LLC, Burlingame, CA (US)

(72) Inventors: Cagkan Yildiz, Burlingame, CA (US); Rahul Patel, Burlingame, CA (US); Rosie Mottsmith, Burlingame, CA (US)

(73) Assignee: PROTERRA POWERED LLC, Burlingame, CA (US)

( * ) Notice: Subject to any disclaimer, the term of this patent is extended or adjusted under 35 U.S.C. 154(b) by 565 days.

(21) Appl. No.: 18/052,272

(22) Filed: Nov. 3, 2022

(65) Prior Publication Data

US 2024/0154228 A1    May 9, 2024

(51) Int. Cl.
*H01M 50/231* (2021.01)
*B60L 50/64* (2019.01)
*H01M 10/613* (2014.01)
*H01M 10/625* (2014.01)
*H01M 10/658* (2014.01)
(Continued)

(52) U.S. Cl.
CPC ........... *H01M 50/231* (2021.01); *B60L 50/64* (2019.02); *H01M 10/613* (2015.04); *H01M 10/625* (2015.04); *H01M 10/658* (2015.04); *H01M 50/204* (2021.01); *H01M 50/224* (2021.01); *H01M 50/227* (2021.01); *H01M 50/229* (2021.01); *H01M 50/24* (2021.01); *H01M 50/258* (2021.01); *H01M 50/276* (2021.01); *H01M 50/278* (2021.01); *H01M 50/28* (2021.01); *H01M 50/282* (2021.01); *B60K 1/04* (2013.01); *B60K 2001/0438* (2013.01); *B60L 2200/18* (2013.01); *H01M 2220/20* (2013.01)

(58) Field of Classification Search
CPC ............. H01M 50/231; H01M 50/204; H01M 50/224; H01M 50/227; H01M 50/229; H01M 50/24; H01M 50/258; H01M 50/276; H01M 50/278; H01M 50/28; H01M 50/282; H01M 2220/20; H01M 10/613; H01M 10/625; H01M 10/658
USPC ........................................................ 429/120
See application file for complete search history.

(56) References Cited

U.S. PATENT DOCUMENTS

2016/0254507 A1    9/2016 Bull et al.
2019/0348652 A1    11/2019 Zhao et al.
(Continued)

FOREIGN PATENT DOCUMENTS

CN    209374623 U  *  9/2019  ............. Y02E 60/10

OTHER PUBLICATIONS

Machine translation of CN 209374623 U (Year: 2019).*
(Continued)

*Primary Examiner* — Kevin P Kerns
(74) *Attorney, Agent, or Firm* — SNELL & WILMER L.L.P.

(57) ABSTRACT

A battery pack includes a housing configured to house one or more battery packs comprising battery cells, the housing including a plurality of walls. at least one of the plurality of walls includes a first insulating layer comprising a phyllosilicate mineral and/or a ceramic; a first metallic layer connected to the first insulating layer; a second insulating layer connected to the first metallic layer; and a second metallic layer connected to the second insulating layer.

18 Claims, 4 Drawing Sheets

(51) Int. Cl.
    *H01M 50/204*     (2021.01)
    *H01M 50/224*     (2021.01)
    *H01M 50/227*     (2021.01)
    *H01M 50/229*     (2021.01)
    *H01M 50/24*     (2021.01)
    *H01M 50/258*     (2021.01)
    *H01M 50/276*     (2021.01)
    *H01M 50/278*     (2021.01)
    *H01M 50/28*     (2021.01)
    *H01M 50/282*     (2021.01)
    *B60K 1/04*     (2019.01)

(56) References Cited

U.S. PATENT DOCUMENTS

2021/0074960 A1     3/2021     Stude et al.
2021/0257690 A1     8/2021     Kilhenny et al.

OTHER PUBLICATIONS

International Search Report and Written Opinion dated Mar. 25, 2024 in PCT International Patent Application No. PCT/US2023/078707.

\* cited by examiner

COMPOSITE BATTERY PACK WALL WITH MICA INNER LAYER

TECHNICAL FIELD

Embodiments of this disclosure relate to battery systems and more specifically to battery systems having multi-layer battery pack walls.

BACKGROUND

An electric vehicle (EV), also referred to as an electric drive vehicle, uses an electric motor for propulsion. Electric vehicles may include all-electric vehicles, where the electric motor is the sole source of power, and hybrid electric vehicles that include an alternate or auxiliary power source (s) in addition to the electric motor. In an electric vehicle, energy may be stored in a rechargeable battery system that includes one or more cells. The cells of the battery system may be housed in, for example, a plurality of battery packs.

Battery systems may generate significant heat. For example, battery systems may generate heat as chemical energy is converted to electrical energy during normal use and they may generate significant heat during abnormal operation as well. For example, after a puncture or other rupture of a battery casing, after degradation of internal components which can lead to internal shorting or excessive discharge, or during other abnormal battery events. Such situations can result in thermal runaway in which one or more cells may enter an uncontrollable, self-heating state. During such events, battery cells and their housing may need to dissipate significant amounts of heat to avoid damaging internal and external components. Additionally, battery cells may be thermally isolated from other components of the system yet still capable of dissipating sufficient heat to avoid internal overheating.

Meanwhile, battery systems for electric vehicles must have structural characteristics sufficient for continuous use in an outdoor, roadway environment. More specifically, battery system housings must be sufficiently strong (e.g., having a high stiffness) to avoid compromising the housing under all operating conditions. Additionally, the housing should be lightweight such that incorporation of one or more battery systems adds as little weight to the vehicle as possible.

Current battery systems for electric vehicles do not provide sufficient thermal isolation for battery cells while also providing sufficient stiffness while minimizing weight. The systems described herein account for these and other failures in the art.

SUMMARY

Embodiments of the present disclosure relate to, among others, systems and methods for thermally and electrically insulating a battery pack.\

In one embodiment, a battery pack includes a housing configured to house one or more battery packs comprising battery cells, the housing including a plurality of walls. at least one of the plurality of walls includes a first insulating layer comprising a phyllosilicate mineral and/or a ceramic; a first metallic layer connected to the first insulating layer; a second insulating layer connected to the first metallic layer; and a second metallic layer connected to the second insulating layer.

In another embodiment, a modular battery assembly, includes a plurality of battery cells; a plurality of battery modules each comprising multiple battery cells; a battery pack including: a housing surrounding the plurality of battery modules that thermally isolates the plurality of battery modules, the housing including: a plurality of walls, wherein at least one of the plurality of walls includes: a first insulating layer that comprises a phyllosilicate mineral and/ or a ceramic and that is between the plurality of battery modules and a first metallic layer; a second insulating layer that comprises a polymer and that is between the first metallic layer and a second metallic layer.

In yet another embodiment, a modular battery assembly for an electric vehicle, includes a plurality of battery cells; a plurality of battery modules each including the plurality of battery cells; a battery pack including: a housing for thermally isolating the plurality of battery modules, the housing including: a plurality of walls, wherein at least one of the plurality of walls including: a first insulating layer that comprises a phyllosilicate mineral and/or a ceramic and that is between the plurality of battery modules and a first metallic layer; a second insulating layer that comprises a polymer and that is between the first metallic layer and a second metallic layer.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. Each of the embodiments disclosed herein may include one or more of the features described in connection with any of the other disclosed embodiments.

DETAILED DESCRIPTION

The present disclosure describes aspects of a battery system of an electric vehicle. While principles of the current disclosure are described with reference to a battery system of an electric vehicle such as an electric bus, it should be understood that the disclosure is not limited thereto. Rather, the battery systems of the present disclosure may be used in any application (electric machine, electric tool, electric appliance, electrified building or structure, energy storage, etc.).

In this disclosure, relative terms, such as "about," "substantially," or "approximately" are used to indicate a possible variation of ±10% in the stated value.

Any implementation described herein as exemplary is not to be construed as preferred or advantageous over other implementations. Rather, the term "exemplary" is used in the sense of example or illustrative.

Figure 1A:
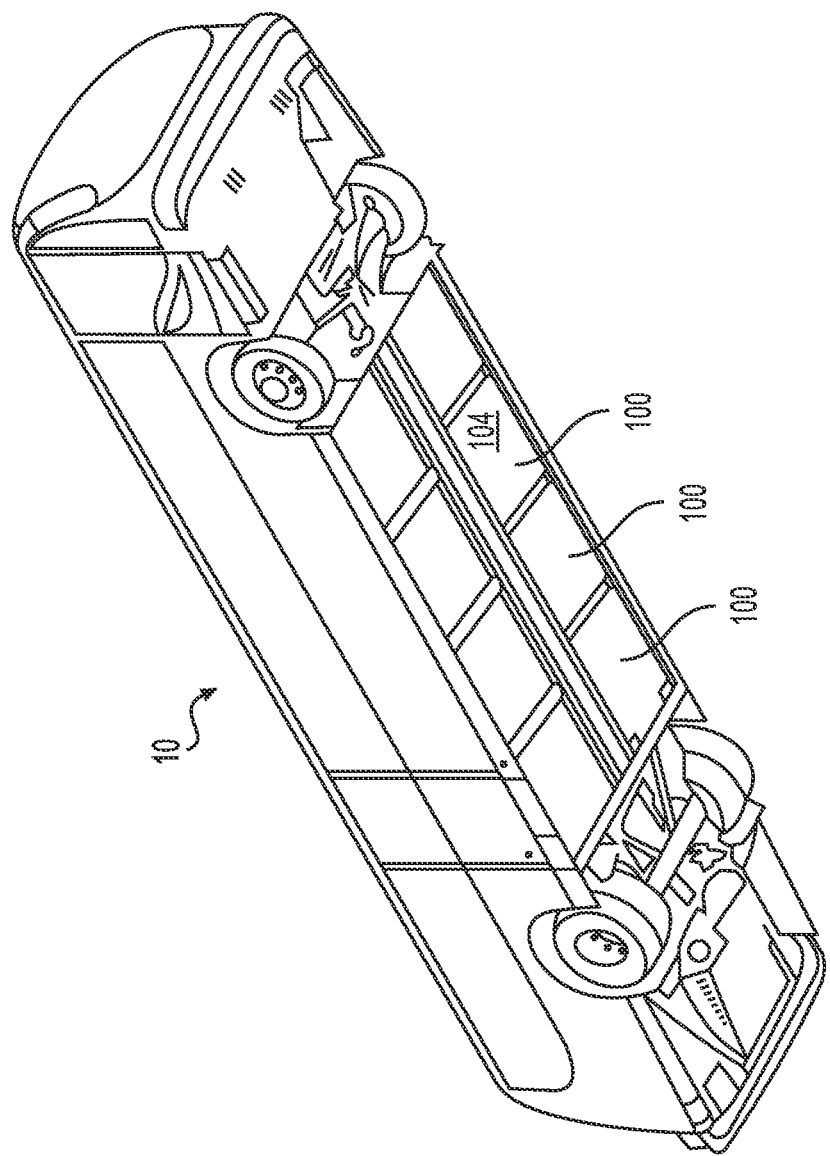
FIG. 1A illustrates an exemplary electrified vehicle including a plurality of battery packs according to one or more embodiments shown and described herein.

FIG. 1A illustrates an undercarriage of an exemplary electrified vehicle 10 (or simply "vehicle"). The vehicle 10 depicted is a passenger bus for transporting multiple passengers, but it is to be understood that the systems described herein are applicable to any vehicle using a battery as the source of energy for propulsion. The vehicle 10 includes a plurality of battery packs 100 beneath a chassis of the bus. The plurality of battery packs 100 may be used as a source of energy to propel the bus. The vehicle 10 shows eight battery packs 100, but it is to be understood that vehicles could have more or fewer battery packs 100. The battery packs 100 may convert stored chemical energy to electrical to supply electrical energy to one or more electric motors to turn the wheels of the vehicle 10. Each of the plurality of battery packs 100 may be a modular battery system including multiple cells as explained in greater detail herein.

Figure 1B:
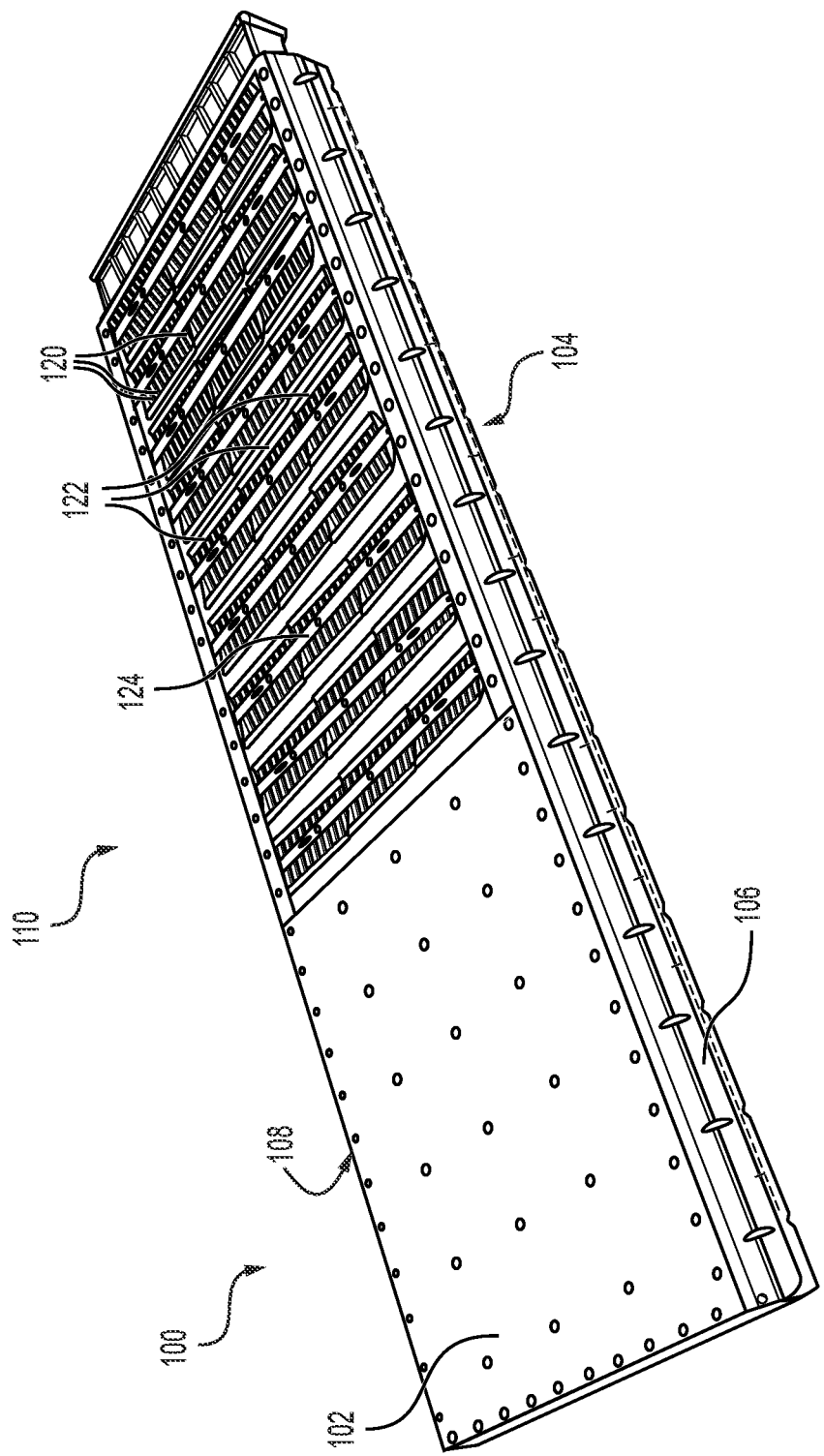
FIG. 1B illustrates an exemplary battery pack including a cutaway top wall for use on the electrified vehicle of FIG. 1A.

FIG. 1B illustrates the battery pack 100 isolated from the vehicle 10 of FIG. 1A. The battery pack 100 includes a housing 110 that includes a top wall 102, a bottom wall 104, a first side wall 106, and a second side wall 108. The first and second sidewalls may be a pair of sidewalls. The housing 110 may be leakproof. In the illustration, the top wall 102 is cutaway strictly for illustrative purposes to show the battery cells 120 and the battery modules 122 housed or otherwise stored in the battery pack 100. In some embodiments, the battery modules 122 may be thermally coupled with a cooling element 124 (e.g., a cooling plate with a cooling fluid (e.g., a liquid coolant) circulated therethrough) that may manage thermal aspects of the battery cells 120 (e.g., remove heat from the cells 120). In some embodiments, the cooling element 124 may also hold the cells 120 in place.

In some embodiments the top wall 102 may serve as a cover for the battery pack 100 such that the top wall 102 may be a structural or semi-structural component that seals and protects the battery pack 100 from environmental factors such as water, dirt/dust, fire, and the like which might contaminate or otherwise compromise integrity or performance of the battery pack 100. In some embodiments, similar to the top wall 102, the bottom wall 104 may be a tray for the battery pack 100 such that the bottom wall 104 serves as a structural component that holds the battery pack 100 and its various subcomponents and related components. The features and characteristics of the battery pack 100 described herein may be applicable to other types of battery packs, for example, battery packs that include a tub and lid, a tub and cover, clam shell battery packs, etc. The bottom wall 104 may protect the battery pack 100 from water, dirt/dust, fire and other environment factors which might contaminate or otherwise compromise integrity or performance of the battery pack 100. In some aspects, the battery pack 100 may be coupled to the undercarriage of the vehicle 10 such that the bottom wall 104 is exposed to the environment beneath the vehicle 10. Air may thus be forced along the bottom wall 104 as the vehicle 10 moves forward and/or reverse to remove heat from the battery pack 100.

Figure 2A:
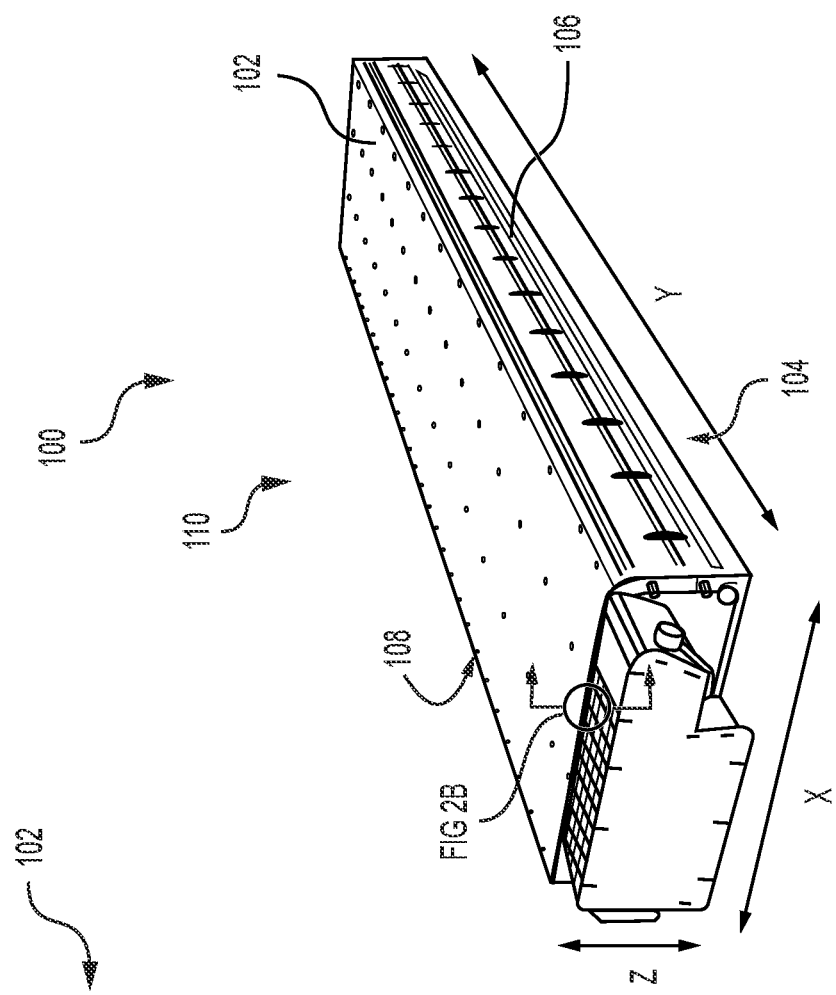
FIG. 2A illustrates another exemplary battery pack for use on the electrified vehicle of FIG. 1A.
Figure 2B:
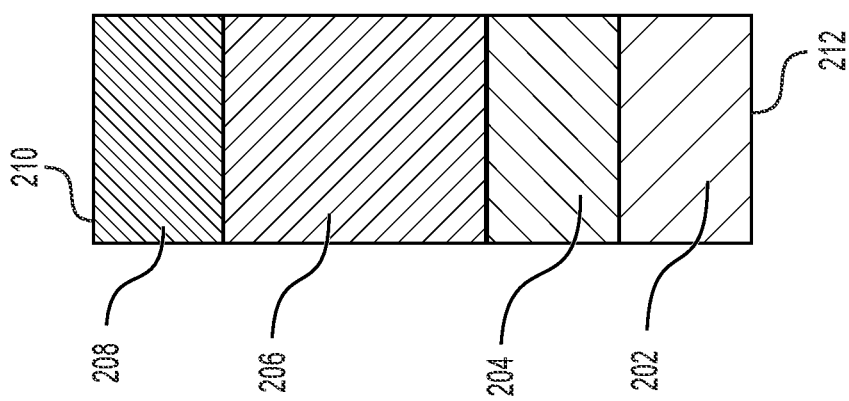
FIG. 2B illustrates a cross section of a top wall of the exemplary battery pack of FIG. 2A.

Referring now to FIGS. 2A and 2B, the battery pack 100 is shown in greater detail. Specifically, FIG. 2B illustrates an exemplary cross-section of the top wall 102 of the battery pack 100 of the close-up section shown in FIG. 2A. The top wall 102 includes a first insulating layer 202, a first metallic layer 204, a second insulating layer 206, and a second metallic layer 208. While only four layers are shown in FIG. 2B, it is understood that any number of layers or combination of layers are contemplated in a layup to form the top wall 102. Further, each depicted layer 202, 204, 206 and 208 can include only the one layer shown or any number of sublayers and/or combination of materials, as needed or required. Further, in some embodiments, there may be some amount of air gap between each of the component layers. For example, there may be a non-zero (e.g., greater than zero inches, etc.) thickness air gap between the first insulating layer 202 and the first metallic layer 204.

In some aspects, the top wall 102 includes an external surface 210 that faces outward from the battery pack 100 and an internal surface 212 that inwardly faces the individual cells of the battery pack 100. One or more of the layers 202, 204, 206 and 208 may be integral with the others and/or one or more of the layers 202, 204, 206 and 208 may be formed as a composite. For example, all of the layers 202, 204, 206 and 208 may be an integrally formed composite (e.g., layers 202, 204, 206 and 208 are formed continuously with each other). As used herein, the term composite means a material formed from a two or more constituent materials, which two or more constituent materials may have dissimilar chemical or physical properties and which may create a material with one or more enhanced or otherwise different properties (e.g., enhanced rigidity) when formed together, while remaining separate and distinct within the final material.

The first insulating layer 202 may be formed as a composite layer including a phyllosilicate mineral or one or more sheet silicates within the composite layer. For example, the first insulating layer 202 may be a mica composite layer, which composite layer may comprise, for example, mica paper, mica powder, or mica flakes dispersed within a matrix filler (e.g., a polymer matrix). In some aspects, the material or composite material that forms layer 202 may be synthetic, naturally occurring, or some combination thereof. In other embodiments, the first insulating layer 202 may include a ceramic material such as, for example, aluminium oxide, magnesium oxide, silicon dioxide, calcium silicates, calcium magnesium silicates or alumina silicates. This material listing is not exhaustive and other ceramic materials are contemplated for use in the first insulating layer 202, wherein contemplated one or more materials of the first insulating layer 202 may embody melting temperatures that range between about 500° C. to greater than about 1500° C. Additionally, in some aspects, the one or more materials of the first insulating layer 202 may generally be lightweight, electrically and/or thermally insulating, and may be relatively inexpensive. The contemplated one or more materials of the first insulating layer 202 may display a thermal conductivity that includes less than 50 W/mK, less than 10 W/mK, less than 1 W/mK, etc. The first insulating layer 202 may include, for example, above about 75% mica and/or ceramic material, above about 85% mica and/or ceramic material, above about 95% mica and/or ceramic material, etc. In some embodiments, the first insulating layer 202 may have a thickness of between 0.5-3 mm, 0.75-2 mm, 0.9-1.7 mm, etc. In addition to being thermally insulating, the first insulating layer 202 may further be electrically insulating by preventing arcing within the battery pack 100.

The first metallic layer 204 and/or the second metallic layer 208 may be formed as a sheet of metal and may provide stiffness to the integral wall 102. The first metallic layer 204 may be formed of, for example, aluminum or aluminum alloy (e.g., 5052, 6061, 6063, etc.), other metal alloy (e.g., steel such as stainless steel, titanium, etc.), and/or magnesium. The first metallic layer 204 and the second metallic layer 208 may distribute heat in multiple directions, such as the X and Y directions as denoted by the corresponding axes in FIG. 2A. In this respect, any heat generated by the battery pack 100 (e.g., by individual cells) does not concentrate at particular regions near a heat source (e.g., a battery cell that may be overheating such as in thermal runaway events). For purposes of this disclosure, "thermal runaway" can include one or more thermal events where cell temperatures range from approximately 180 C to approximately 1200 C. In some aspects, thermal runaway in the battery packs of this disclosure can be attributed to overheating due to an internal short, physical damage, penetration of the battery pack, foreign object debris causing a short, cell voltage imbalance causing overcharge, etc.

In overheating scenarios, concentration of heat might cause warping, buckling, or damage to the multi-layer wall. More particularly, because the first insulating layer 202 prevents heat transfer in any particular direction (e.g., including in directions such as the X, Y, Z axes) the heat passing through that first insulating layer 202 and onto the other layers may be concentrated near the source of the heat. The first metallic layer 204 and second metallic layer 208 help distribute heat across a wider area of the top wall 102 than would otherwise be possible with only the insulating layers due to their relatively higher thermal conductivity. This distribution relieves some stresses caused by thermal gradients within the wall. In some embodiments, one or more of the first metallic layer and the second metallic layer may be treated using one or more of hot dip galvanization and an epoxy coating The second insulating layer 206 may be a polymer-based composite layer. In some aspects, the second insulating layer 206 can include a resin and a substrate. In some embodiments, the second insulating layer 206 may be sandwiched between the first and second metallic layers 204, 208 and may provide further thermal and electrical isolation of the battery modules 122 from the surrounding environment.

Each of the insulating layers 202, 206 may be formed individually or together with one or more other layers using various processes for generating composite structures. For example, the first and second metallic layers 204, 208 may be formed into a sheet of multiple layers together with the second insulating layer 206 and then the first insulating layer 202 may be subsequently laminated onto the formed sheet. In one example, the layers may be formed using a sheeting molding compound process, a resin transfer molding process, a liquid compression molding process, and the like. Liquid composite molding processes may be used to create one or more of the layers. For example, one or more of the layers may be created using a liquid composite molding process including resin transfer molding, vacuum-assisted resin transfer molding, a Seemann composite resin infusion molding process (SCRIMP) and/or an injection compression molding (ICM) process. In some embodiments, the overall thickness of the wall formed by layers 202, 204, 206, 208 may be between about 2-10 mm, between about 4-8 mm, between about 5-7 mm, etc.

Figure 3:
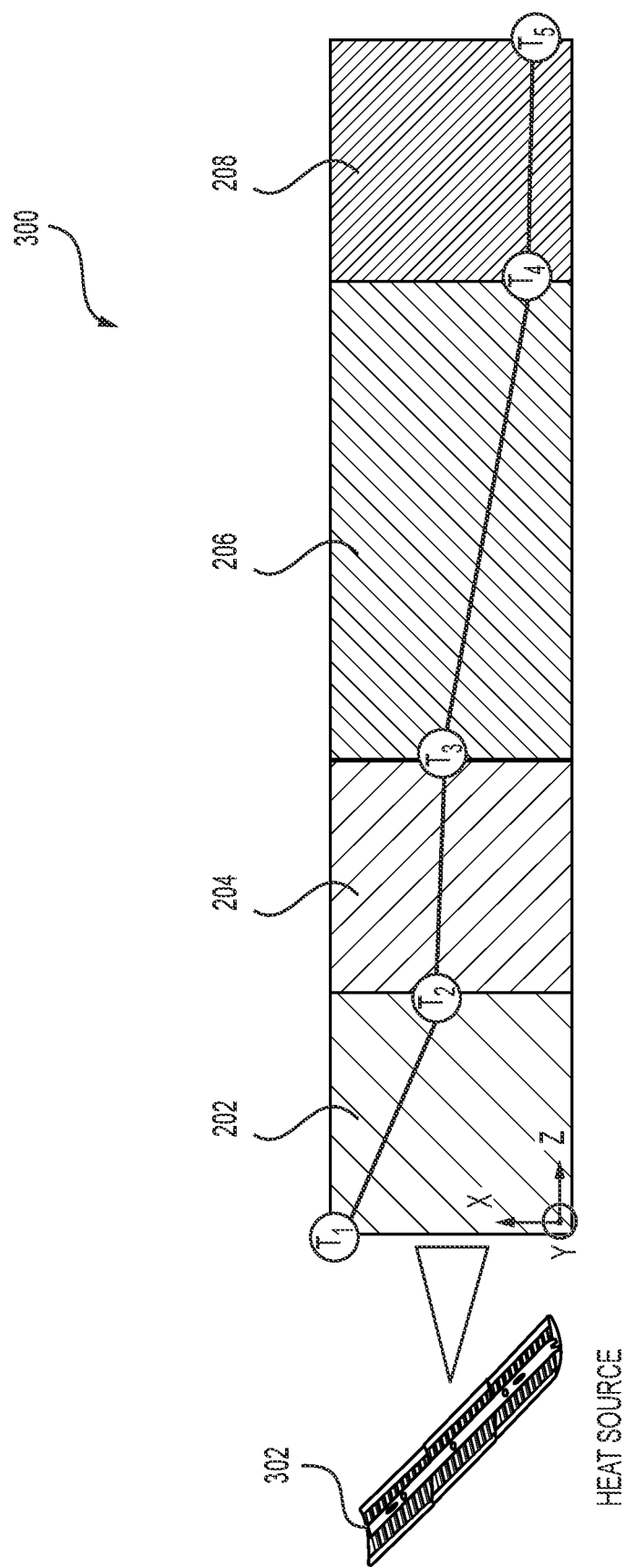
FIG. 3 illustrates a chart showing a thermal gradient across the top wall of FIG. 2B.

Referring now to FIG. 3, a chart 300 depicts an exemplary thermal gradient across the top wall 102 of the battery pack 100. The thermal conductivity across the layers 202, 204, 206, 208 may depend on material properties and related factors. Such factors can include resin type, fiber type, the specific architecture of each layer and their overall architecture, the fiber volume fraction, the direction of the thermal flux across layers of the wall, and the difference in temperature across layers of the wall. The heat source 302 can be the battery cells 120 of the battery pack 100.

The temperature drop from T1 to T2 across the first insulating layer 202 may be substantial due to the insulative properties of the filler within the first insulating layer 202. For example, the first insulating layer 202 may provide the highest temperature drop (e.g., approximately 80% of the total drop in temperature can occur in the first insulating layer 202) per unit thickness compared to in other layers (e.g., layers 204, 206, 208) of the multi-layer laminate composite wall 102. This is due in part to the filler (e.g., one or more insulative materials such as mica) in the first insulating layer 202.

It is possible to optimize the material characteristics of the wall 102 to achieve desired thermal, electrical, and mechanical properties, for example, by changing the concentration of filler (e.g., mica and/or other insulating filler) in the first insulating layer 202 to adjust the thermal, electrical, and mechanical characteristics of the first insulating layer 202. For example, increasing the filler concentration (e.g., to include a greater concentration of mica or other insulating filler) may result in higher thermal and electrical isolation of the battery cells 120 while higher concentrations of filler may result in higher flexural strength and modulus but lower tensile strength. In some embodiments, the filler may be arranged in particular orientations (e.g., along the Y-axis of the battery pack 100) to provide anisotropic thermal conductivity characteristics to the wall. In other embodiments, the concentration of the insulating filler may be increased or decreased to change an insulative capacity of the wall, which may allow layers of decreasing or increasing thickness. In some embodiments, the makeup of the insulating layers can be optimized for, for example, higher torsional stiffness to mass ratio, higher bending stiffness to mass ratio, and other properties.

A thickness of the individual layers of the walls 102, 104 may be optimized to avoid warping and/or buckling and delamination of any of the herein discussed layers upon the application of heat to the system. More specifically, the geometry of the layers and their thermal expansion characteristics may be optimized such that layers remain as a solid, integral wall through all operating conditions, including an over temperature event.

While principles of the present disclosure are described herein with reference to the battery system of an electric vehicle (e.g., a bus), it should be understood that the disclosure is not limited thereto. Rather, the systems described herein may be employed in the batteries of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A battery pack comprising:
 a housing configured to house one or more battery modules comprising battery cells, the housing comprising a plurality of walls, wherein
 at least one of the plurality of walls comprises:
 a first insulating layer being a mica composite layer comprising a phyllosilicate mineral and a ceramic;

a first metallic layer connected to the first insulating layer;
a second insulating layer connected to the first metallic layer and sandwiched between the first metallic layer and a second metallic layer; and
the second metallic layer connected to the second insulating layer.

2. The battery pack of claim 1, wherein the second insulating layer comprises a polymer.

3. The battery pack of claim 1, wherein the at least one of the plurality of walls is a top wall, and a bottom wall of the plurality of walls comprises:
a first insulating layer comprising a phyllosilicate mineral and/or a ceramic;
a first metallic layer connected to the first insulating layer;
a second insulating layer connected to the first metallic layer; and
a second metallic layer connected to the second insulating layer.

4. The battery pack of claim 1, wherein the first insulating layer is an innermost layer of the at least one of the plurality of walls, the first metallic layer is between the first insulating layer and the second insulating layer, and the second metallic layer is an outermost layer.

5. The battery pack of claim 1, wherein one or more of the first metallic layer and the second metallic layer comprises one or more of steel, stainless steel, aluminum, titanium, and magnesium.

6. The battery pack of claim 1, wherein a thermal isolation per unit thickness provided by the first insulating layer is greater than the thermal isolation per unit thickness provided by the second insulating layer.

7. The battery pack of claim 1, wherein one or more of the first insulating layer and the second insulating layer are electrical and/or thermal insulators.

8. A modular battery assembly, comprising:
a battery pack comprising a plurality of battery cells and
a plurality of battery modules each comprising multiple battery cells, the battery pack comprising:
a housing surrounding the plurality of battery modules that thermally isolates the plurality of battery modules, the housing comprising:
a plurality of walls, wherein
at least one of the plurality of walls comprises:
a first insulating layer being a mica composite layer that comprises a phyllosilicate mineral and a ceramic and that is between the plurality of battery modules and a first metallic layer;
a second insulating layer that comprises a polymer and that is sandwiched between the first metallic layer and a second metallic layer.

9. The modular battery assembly of claim 8, wherein the first metallic layer and the second metallic layer comprise one or more of steel, stainless steel, aluminum, titanium, and magnesium.

10. The modular battery assembly of claim 8, wherein the plurality of walls form a leakproof housing.

11. The modular battery assembly of claim 8, wherein a bottom wall of the plurality of walls comprises a bottom wall first insulating layer that comprises a phyllosilicate mineral and/or a ceramic between the plurality of battery modules, and wherein a bottom wall first metallic layer and a bottom wall second insulating layer comprise a polymer between the bottom wall first metallic layer and a bottom wall second metallic layer.

12. The modular battery assembly of claim 8, wherein a thermal expansion of the first metallic layer is within approximately 10% of the second metallic layer.

13. The modular battery assembly of claim 8, wherein the first insulating layer is thinner than the second insulating layer.

14. The modular battery assembly of claim 8, wherein the mica is synthetic or naturally occurring.

15. A modular battery assembly for an electric vehicle, comprising:
a battery pack comprising a plurality of battery cells and
a plurality of battery modules each comprising the plurality of battery cells, the battery pack comprising:
a housing for thermally isolating the plurality of battery modules, the housing comprising:
a plurality of walls, wherein at least one of the plurality of walls comprising:
a first insulating layer being a mica composite layer that comprises a phyllosilicate mineral and a ceramic and that is between the plurality of battery modules and a first metallic layer;
a second insulating layer that comprises a polymer and that is sandwiched between the first metallic layer and a second metallic layer.

16. The modular battery assembly of claim 15, wherein the first metallic layer and the second metallic layer comprise one or more of steel, aluminum, titanium, and magnesium.

17. The modular battery assembly of claim 15, wherein the plurality of walls form a leakproof housing.

18. The modular battery assembly of claim 15, wherein the plurality of battery modules are cooled by a cooling element that is between the battery modules and the at least one of the plurality of walls.

* * * * *